(No Model.) 3 Sheets—Sheet 1.
C. TELLIER.
APPARATUS FOR PURIFYING, AERATING, AND FILTERING WATER, &c.
No. 417,372. Patented Dec. 17, 1889.
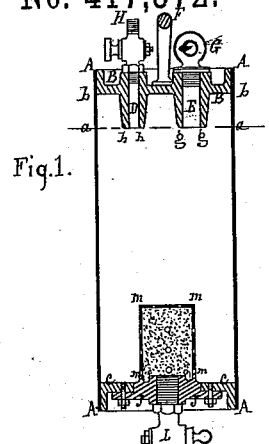
Fig.1.
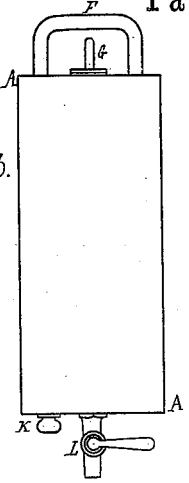
Fig.3.
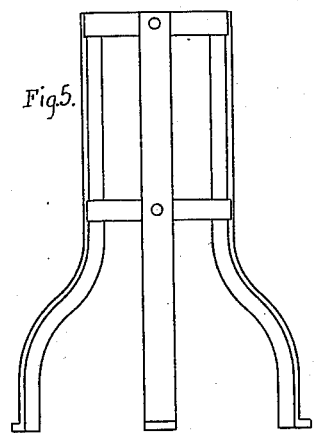
Fig.5.
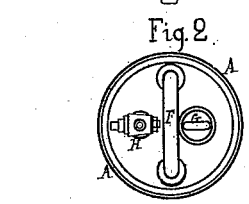
Fig.2.
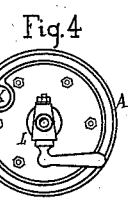
Fig.4.
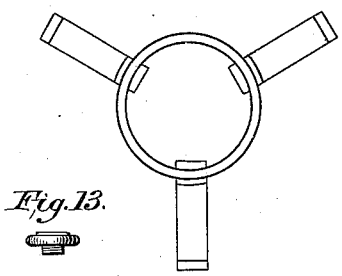
Fig.6.
Fig.10
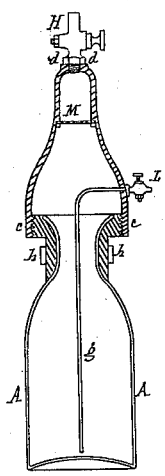
Fig 12
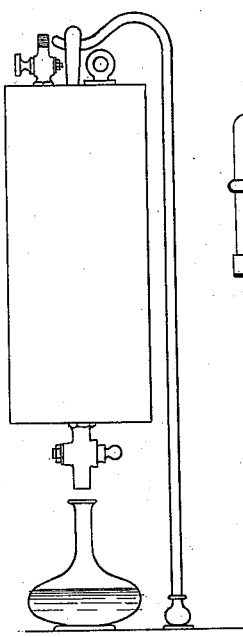
Fig.13.
Fig.11.
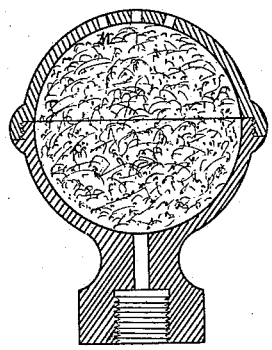
Witnesses
Will T. Norton
Hiram Bell
Inventor
Charles Tellier
by John J. Halsted & Son
his Attys (No Model.) 3 Sheets—Sheet 2.

C. TELLIER.
APPARATUS FOR PURIFYING, AERATING, AND FILTERING WATER, &c.

No. 417,372. Patented Dec. 17, 1889.

Witnesses
Will S. Norton
Alvin Bell

Inventor
Charles Tellier
by John J. Halsted & Son
his Attys.

N. PETERS, Photo-Lithographer, Washington, D. C.

(No Model.) 3 Sheets—Sheet 3.
C. TELLIER.
APPARATUS FOR PURIFYING, AERATING, AND FILTERING WATER, &c.
No. 417,372. Patented Dec. 17, 1889.
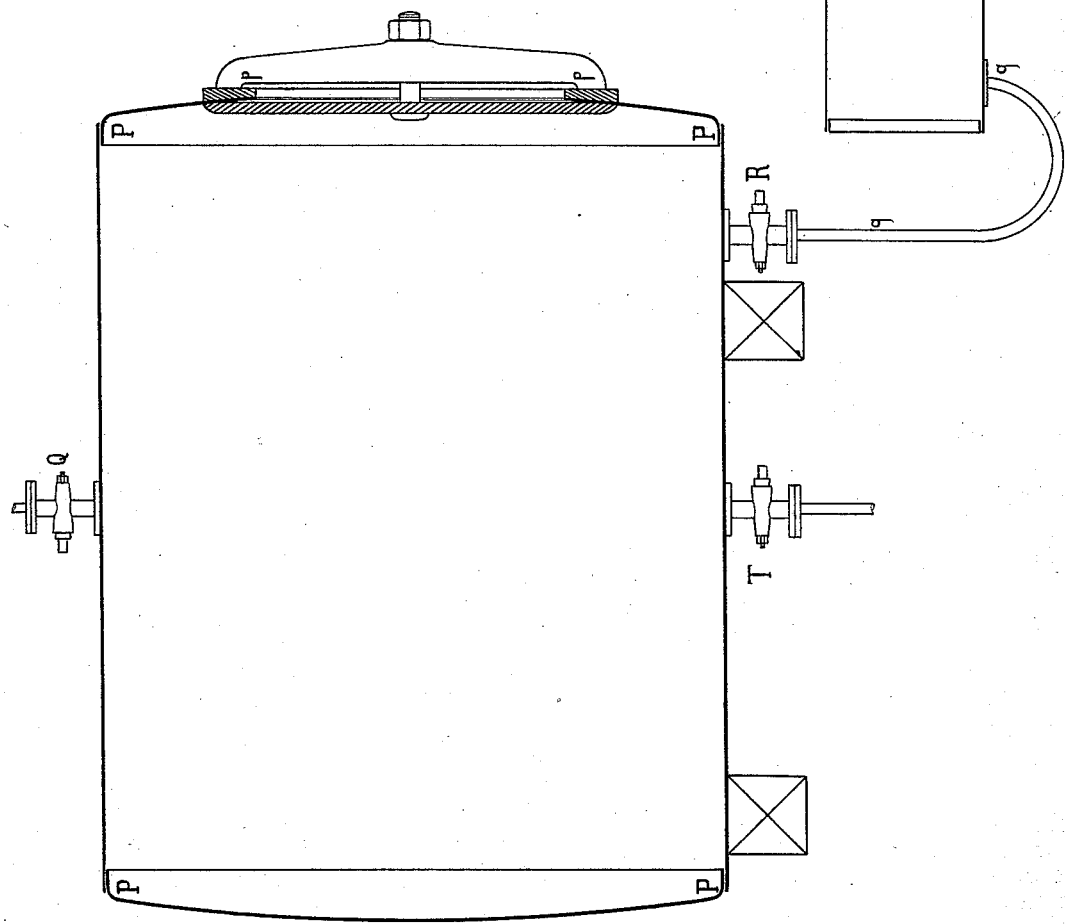

UNITED STATES PATENT OFFICE.

CHARLES TELLIER, OF PARIS, FRANCE.

APPARATUS FOR PURIFYING, AERATING, AND FILTERING WATER, &c.

SPECIFICATION forming part of Letters Patent No. 417,372, dated December 17, 1889.

Application filed April 16, 1889. Serial No. 307,402. (No model.) Patented in England April 20, 1887, No. 5,777; in Germany May 7, 1887, No. 42,740; in Belgium May 10, 1887, No. 77,500; in France October 12, 1887, No. 186,433, and in Austria-Hungary December 19, 1887, No. 21,056 and No. 56,955.

*To all whom it may concern:*

Be it known that I, CHARLES TELLIER, a citizen of the Republic of France, residing at Paris, France, have invented a new and useful Improved Apparatus for Purifying, Aerating, and Filtering Natural and Artificial Waters and other Beverages, (patented in Great Britain by Letters Patent No. 5,777, dated April 20, 1887; in Germany, No. 42,740, dated May 7, 1887; in Belgium, No. 77,500, dated May 10, 1887; in Austria-Hungary, Nos. 21,056 and 56,955, dated December 19, 1887, and in France, No. 186,433, dated October 12, 1887,) of which the following is a specification.

My invention relates to apparatus for purifying, aerating, and filtering natural and artificial waters and other beverages, and is illustrated in the accompanying drawings, in which—

Figure 7:
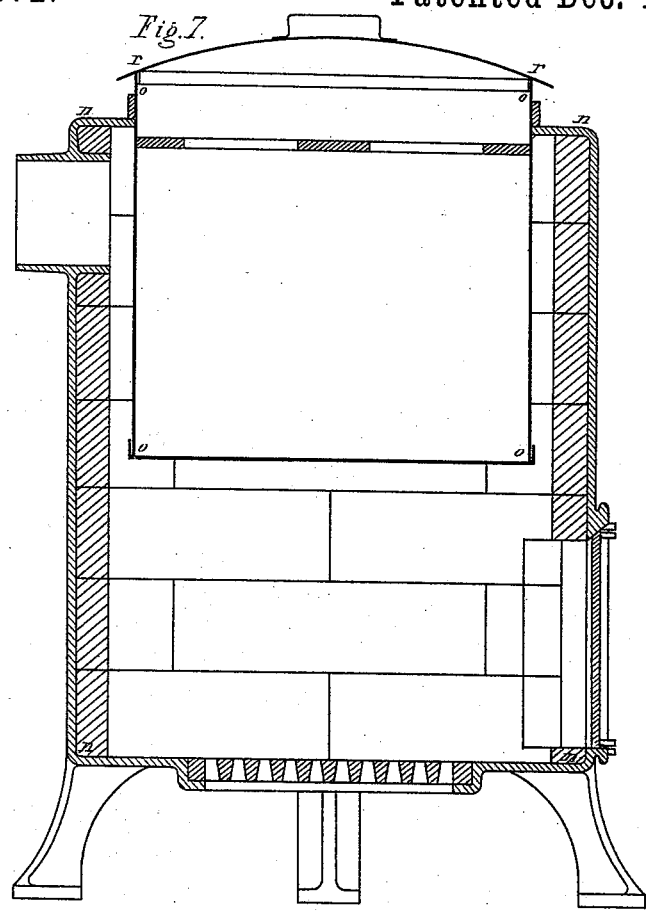
Figure 8:
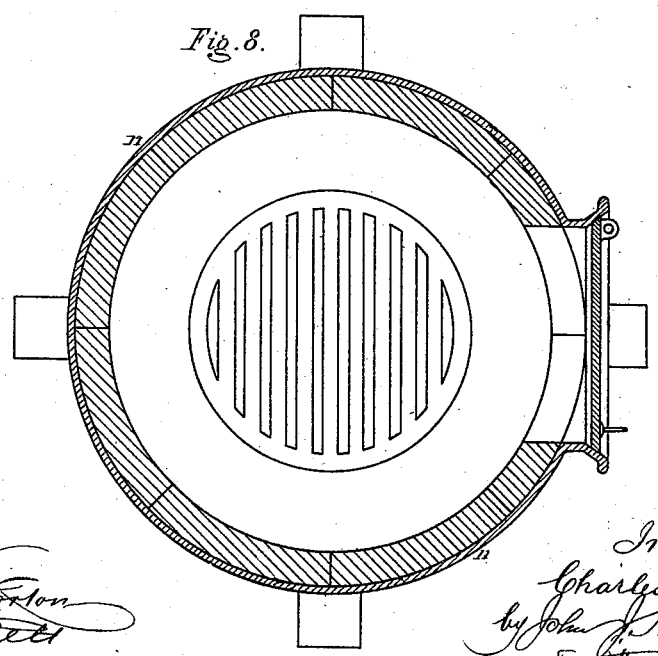

Figure 1 is a vertical section, Fig. 2 is a plan, Fig. 3 is an elevation, and Fig. 4 is an under side plan, of the vessel containing the water. Fig. 5 is an elevation, and Fig. 6 is a plan, of a stand or support for the said vessel. Fig. 7 is a vertical section, and Fig. 8 is a horizontal section, of the apparatus for heating a small quantity of water. Fig. 9 represents an apparatus for heating a large quantity of water. Fig. 10 is a modification of the apparatus represented in Fig. 1. Fig. 11 is a vertical section of a filter. Fig. 12 is an elevation of a vessel similar to that shown in Fig. 1 suspended over a water-bottle. Fig. 13 is an elevation of a bottle intended to contain the heated water and provided with its stopper, separately shown in side view.

The object of my invention is to prepare water intended for drinking purposes and other beverages by heating them and at the same time preserve their aeration, to filter them, and to allow of adding thereto certain gases or certain salts which will render the water or other beverage easier of digestion. The purpose for which I heat the water is to destroy any morbific germs which it may contain.

I place the water to be treated in a vessel. (Shown in Figs. 1 to 4.) This vessel is constructed of a cylindrical metal case A A A A, closed at the top by a plate B B and at the bottom by a plate C C, connected to the cylindrical part A A A A by rivets, screws, or other suitable means. The upper plate is provided with two openings D and E, placed so as to allow of a handle F being located between them for carrying or lifting the apparatus. The apparatus is filled through the openings D and E. To allow of this, the stopper G must be unscrewed, (the stopper can, if required, be replaced by a cock or valve,) and then through the opening $g$ $g$, which is thus left free, the water to be heated or prepared is poured. The air contained in the apparatus escapes through the cock H.

As the water when being heated gradually increases in volume, the vessel should not be completely filled; otherwise the expansion might burst the vessel; also, it is necessary that the quantity of water to be introduced, as well as the amount of space to be left free, should be self-regulating. The means which I have found to answer well for this purpose consist in placing under the openings D and E the tubes $h$ $h$ and $g$ $g$, extending below the cover. The level of the water introduced cannot then exceed the line $a$ $a$, and the space contained between $a$ $a$ and $b$ $b$ will remain full of air, which will allow of expansion taking place without danger. The bottom plate consists of a ring C C, having a plate J J fixed to it by bolts or screws, so as to form a joint which can be unfastened when required to allow of inspecting and cleaning the apparatus. To facilitate this operation, a screw or plug K, Figs. 3 and 4, is placed in the bottom C C, so as to allow by unscrewing the same of water being passed into the apparatus for washing out the inside and withdrawing the deposits produced by the boiling operation. In order to prevent these deposits precipitated by the boiling operation from being drawn off by the consumer, a small perforated chamber $m$ $m$ $m$ $m$ is mounted over the discharge-cock L. Sponge, carbon, or other suitable filtering material is placed therein. The filter thus constituted retains the matters held in suspension in the water, and as at each operation it is heated with the water it becomes by that means purified.

The pulverulent material usually employed in the interior of the filter can be replaced by an outer covering of felt, wool, or swanskin surrounding the chamber *m*.

For holding the apparatus I can make use of the three-legged stand or support represented in Figs. 5 and 6, and which will require no description to enable it to be understood.

To draw the water from the vessel, it is only necessary to open the cocks L and H, when the water will run through the cock L and air will enter the apparatus through the cock H. To prevent any noxious germs in the said air from entering the apparatus, I screw on the upper part of the cock H a Pasteur filter, Fig. 11, consisting of a chamber M, filled with cotton-wool.

The apparatus for submitting the said vessel filled with water to the action of heat is represented at Figs. 7 and 8. I make use of this apparatus when only a small quantity of water is to be heated. It comprises a furnace *n n n n*, in which is placed a boiler *o o o o*, provided with a cover *r r*. In this boiler I place a solution of sea-salt, which boils at 110° centigrade, or a solution of potash, which boils at 140°, or a solution of chloride of calcium, which boils at 160°, &c. The hereinbefore-described vessels filled with drinking-water are placed in the said solution, which is then heated to boiling-point, at which it should be maintained for about an hour. Under the influence of the heat the microbes are destroyed, and as the water remains under pressure during the whole of the time the air cannot escape and remains dissolved in the water, thereby attaining the desired object.

The apparatus just described would not be suitable for dealing with a large quantity of water. In that case it would be advisable to establish works for preparing the water and for distributing the same. I then make use of the apparatus represented in Fig. 9, which comprises a vessel P P P P, capable of withstanding a considerable internal pressure. This vessel is closed by a large cover *p p*, which when removed will allow a person to enter the vessel. When this vessel has been filled with the hereinbefore-described apparatuses containing water, the mouth or opening *p p* is closed and a cock Q is opened, through which steam is introduced. The steam heats the apparatuses, and as it is condensed the water produced by the condensation is run off through a cock R and is conducted by a tube *q q* into a tank S. The said water is then conveyed to the boiler through a tube *s* by any suitable known means. When the required temperature has been reached— that is to say, 150° or more—the cocks Q and R are closed and the cock T is opened to admit a current of cold water. When the apparatuses are cool, they can be removed from the vessel P P and be delivered to the consumers.

Fig. 10 shows a modification of my apparatus. It consists of a vessel which I employ instead of that shown in Fig. 1. This vessel is in the form of a glass or earthenware bottle A A, on the neck of which is fixed a ring *h h*. Over this ring I screw a chamber *c c d d*, having a cock H at its upper part and containing a filter M. The chamber *c c d d* is sufficiently large to allow of the expansion of the water. The bottle can be filled by unscrewing the chamber *c c d d*; otherwise it is used in the manner hereinbefore described. I can add to the water under treatment carbonic acid in order to dissolve the calcareous deposits precipitated by the action of the heat; or, by preference, I prevent the precipitation of the calcareous matter by saturating the water before heating the same.

Fig. 12 shows a vessel similar to that shown in Fig. 1 suspended above a water-bottle.

I can employ the hereinbefore-described apparatuses for treating or preparing gaseous mineral waters (natural or artificial) and perishable beverages, such as beer, cider, &c.

Having now particularly described and ascertained the nature of my said invention and in what manner the same is to be performed, I declare that what I claim is—

1. A metal, glass, or earthenware vessel A, adapted for heating, purifying, aerating, and filtering waters and beverages, as made with a closed top and bottom, cock H, an internal filter, and a discharge-cock L, the apparatus being adapted for heating the contents under pressure.

2. In combination with a vessel closed at top and bottom, the two top inlet-openings D and E, severally provided with the tubes *h* and *g*, for the purpose set forth, the bottom ring C, and a removable bottom plate J, provided with a discharge-cock, and a perforated chamber *m*, mounted over such cock and adapted for containing a filtering material.

3. In combination with the vessel A, having a closed top and bottom, and having inlet and outlet tubes and cocks, as set forth, a filter inside the vessel and an external Pasteur filter consisting of a chamber filled with cotton-wool applied to an inlet-cock, all substantially as set forth.

4. In an apparatus for heating and aerating water and other beverages, the combination, with an air-tight vessel A, of the filtering-tube E, having means, as described, for closing the same air-tight, and tube D, having an air-tight cock, both tubes being part of top plate B, provided with a handle F, and both extending below the under surface of said plate to the same predetermined line, as and for the purposes set forth.

CHARLES TELLIER.

Witnesses:
H. DUSERY,
PAUL UGINES.